United States Patent [19]

McLeod

[11] Patent Number: 4,492,299
[45] Date of Patent: Jan. 8, 1985

[54] ARTICLE TURNING DEVICE

[75] Inventor: Alasdair D. McLeod, Hull, England

[73] Assignee: B.M.H. Feedgear, Hull, England

[21] Appl. No.: 398,135

[22] Filed: Jul. 14, 1982

[30] Foreign Application Priority Data

Jul. 14, 1981 [GB] United Kingdom ............. 8121651

[51] Int. Cl.$^3$ ............................................. B65G 47/24
[52] U.S. Cl. .................................... 198/417; 193/46
[58] Field of Search ................ 198/417, 410; 193/46

[56] References Cited

U.S. PATENT DOCUMENTS 3,446,334  5/1969  Donner ............................. 198/417

FOREIGN PATENT DOCUMENTS 2111798  3/1971  Fed. Rep. of Germany ........ 193/46

Primary Examiner—Joseph E. Valenza
Assistant Examiner—Dennis Williamson
Attorney, Agent, or Firm—William A. Drucker

[57] ABSTRACT

The device comprises a succession of members in the form of plates collectively defining a path of traverse of the article to be turned, by means of apertures in the plates; each aperture being of the outline shape of the article and being angularly offset so that parts of each succeeding plate of the succession obstruct the path of the article incrementally to deflect the article as it passes through the aperture of each plate about an axis passing through the article and parallel with the path of traverse, thereby to change the orientation of the article.

12 Claims, 3 Drawing Figures

ARTICLE TURNING DEVICE

FIELD OF THE INVENTION

This invention relates to a static article-turning device and more particularly to a device for turning a succession of substantially rigid articles of identical, or substantially identical, shape and configuration.

BACKGROUND OF THE INVENTION

Many industrial practices require a succession of articles being processed to be turned to change the orientation of the articles, for example, to lie each article on its side or to invert the article, and in the container and packaging industries an open rigid container may be turned a number of times between manufacture and the final charging and closure of the container.

There are a number of powered devices for turning articles but such powered devices are complicated and expensive to manufacture, requiring a continuous power supply and are therefore expensive to run and maintain, and as such devices normally run at a constant speed they cannot readily accommodate surges in the production line.

It is also well known in the art to use static turning devices for turning articles and such devices conventionally comprise continuously fixed guide surfaces inclined to the general direction of displacement of the articles so that, as each article is advanced along said guide surfaces whilst maintaining its general direction of displacement, the article is continuously turned about an axis parallel to its general direction of displacement. To maintain control of the articles passing through the static turning device, thus to prevent an article from tipping forwardly or rearwardly relative to the general direction of displacement, and to provide the force for driving the articles through the device, the articles are supplied to, and pass through, the device with each article contacting the adjacent preceding and succeeding article and the driving force is applied through the articles waiting to enter the device and is transmitted to the articles in the device by the contacting relationship of the articles.

In one well known and recognised method for developing the driving force to urge articles through the turning device articles to be turned are delivered to the device on a conveyor which runs faster than the rate of displacement of articles through the device, this allows an accumulation of articles, in succession, on the conveyor and the frictional engagement of the articles with the conveyor develops the driving force necessary to drive the articles through the device.

Articles capable of being turned by the turning device must have sufficient rigidity to receive and transmit the driving force, to withstand the substantial forces developed between the article and the inclined guide surfaces, and sufficient rigidity for the article to be turned by the guide surfaces and any article having the rigidity to meet those parameters is a "substantially rigid" article as that term is used in the present specification.

It will be appreciated that each guide surface effective on an article must follow a spiral path around the axis of the device and the device must be capable of withstanding thrust exerted on the guide surfaces by the turning articles acting under the driving force and to meet these requirements the inclined guide surfaces are conventionally formed on elements of substantial mass extending in the direction of the device and the working of the spiral guide surfaces on said elements is a complicated and very expensive exercise.

OBJECTS OF THE INVENTION

It is an object of the present invention to provide a simpler, but efficacious, static article-turning device.

It is a primary object of the present invention to provide such a device providing a path of transverse for the articles to be turned such that turning of an article to the desired orientation is effected incrementally by a succession of obstructing members.

It is a further object of the present invention to provide such a device in which a path of traverse for the articles is defined by apertures of a succession of plates, the apertures being angularly displaced in relation to one another.

It is also an object of the present invention to assemble the plates in succession by tie rods passing through holes in the plates and to form the holes with the plates in the same orientation while forming the apertures therein by changing the orientation of each successive plate.

It is also an object of the present invention to assemble the plates in succession by tie rods passing through holes in the plate and to form the apertures in the plates with the plates in the same orientation while the holes are formed therein by changing the orientation of each successive plate.

It is a still further objection of the present invention to provide such a device for use with a conveyor providing a moving conveyor surface and adapted to be mounted adjacent the conveyor surface whereby the conveyor enters articles into the device and provides the force needed to urge the articles through the device.

SUMMARY OF THE INVENTION

Briefly, the device of the invention comprises an assembly of plates arranged as a succession, each plate bearing an aperture generally of the outline shape of the article to be turned and the apertures collectively defining a path of traverse through the device of the article to be turned; the apertures in each succeeding plate being angularly displaced in relation to that of the preceding plate so that parts of each succeeding plate delineating the aperture thereof form obstructions to deflect the article as it passes along said path of traverse about an axis passing through the article and parallel with the path of traverse, whereby the apertures collectively effect incremental deflection of the article about said axis to turn it to the desired orientation.

Thus, a simple but efficacious turning device is provided.

It will now be observed that, contrary to the continuous guide surfaces hithertofore essential to a static turning device, the construction proposed by the present invention provides article guides in each plate so that each plate or group of plates imparts a small degree of turning to each article passing therethrough and the turning of each article passing through the device is effected incrementally in a plurality of steps rather than in a continuous manner as practised by the prior art device.

In a preferred embodiment in accordance with the invention the plates are in contacting relationship, that is to say each plate contacts the preceding and succeeding plate, but in an alternative arrangement the plates, or selected group of plates, may be spaced apart in the general direction of article displacement through the device: such spacings of plates must be small so as not to adversely affect the passage of the articles through the device, but this arrangement allows access to the articles in the device and, by way of example, jets of air or liquid may be directed through the spacings onto the articles to enforce a turning of the articles, thus to reduce the thrust on the device in the direction of article displacement and, in some cases, to allow the overall length of the device to be reduced.

Preferably the plates are retained in their respective planes by tie members, extending at right angles to the planes of the plates, and in a preferred embodiment the stack of plates is held in compression between two rigid shoes by tie bars passing through said shoes and with such an embodiment the tie bars may pass through apertures in the stack of plates or may lie outwardly of the stack of plates.

Preferably the plates are formed of a rigid material, conveniently of low friction plastics material, and such rigid plates preferably have a thickness between 1 mm and 10 mm. When the plates are relatively thick, having a thickness greater than 5 mm, each plate will have its cut-out off-set from the cut-outs in the adjacent preceding and succeeding plates but when the plates are relatively thin, having a thickness less than 2 mm, two or more adjacent plates may form a set with their cut-outs aligned so as to act, in effect, as a "thick" plate.

The cut-out in each plate may be moulded with the plate, punched or otherwise formed in a single operation, or cut by any profiling means. In one convenient method of manufacture, the cut-outs are punched through the plates, the plates being fed successively to the press, and whereby the cut-outs in all the plates are of identical shape and configuration. In a more preferred embodiment the press includes a head, rotatable about the axis of the cut-out punch, and which presents two spaced apart punches for forming holes through each plate at locations spaced from the cut-out. The rotation of the head about the cut-out punch is controlled by an indexing mechanism which rotates the head through a small arc, in a fixed direction of rotation, between punching operations on successive plates and thus, when all the plates to form a device have been punched, the plates can be threaded on two guide rods passing through the said holes in the order in which the plates passed through the press and the "off-set" of the cut outs in the plates is automatically obtained.

Alternatively, the holes may be punched identically in each plate and the orientation of cut-out changed for each plate.

DETAILED DESCRIPTION OF THE INVENTION

Other objects and advantages of the invention will become apparent from the following description taken in conjunction with the accompanying drawings in which.

Figure 1:
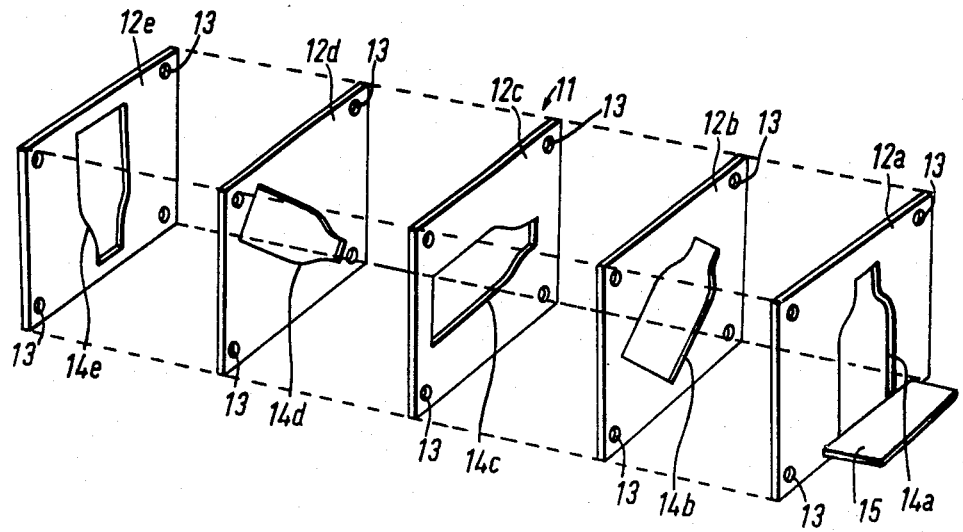
FIG. 1 shows, in phantom, parallel plates defining an article turning device in accordance with the invention with selected plates in the stack shown in full.

The article turning device 11, shown in phantom in FIG. 1, comprises a plurality of rectangular plates 12 of identical external dimensions in stacked relationship, each plate 12 has four bores 13 therethrough, there being a bore 13 adjacent each corner of each plate, and when the plates 12 are in stacked relationship with their outer edges lying in four common planes the bores 13 adjacent each corner of the stack of plates 12 are aligned to form continuous bores passing end to end through the stack of plates and four tie bolts (not shown) can be passed through the four continuous bores to retain the plates 12 in fixed relationship to one another.

Each plate 12 has a cut-out 14 therethrough, in the illustrated example each cut-out 14 is an aperture, the cut-outs 14 are all of identical shape and configuration, and in the FIG. 1 embodiment each cut-out has the general outline of a bottle.

To avoid confusion in describing the attitude of a cut-out 14 relative to other cut-outs 14 the term "central axis" when applied to a cut-out 14 means that axis passing centrally between the two cut-out surfaces defining the "neck" of the bottle shape and centrally between the two aperture surfaces defining the "body" of the bottle shape.

In the illustrated example the first plate 12a defines the entry end of the device 11 and is arranged to receive a succession of bottles into its aperture 14a, the bottles being delivered over a dead plate 15 in their normal free-standing position, that is with each bottle standing on its base and with its neck uppermost, and the central axis of the cut-out 14a is therefore vertical with the neck part of the cut-out 14a above the body part thereof. The second plate 12, that is to say, the plate immediately adjacent plate 12a, has the central axis of its cut-out 14 off-set clockwise by a small amount relative to the central axis of the cut-out 14a and successive plates 12 in the stack, in the direction through the device, each have the central axis of their respective cut-outs 14 off-set by a small amount clockwise from the axis of the cut-out 14 in the preceding plate. Thus, the central axes of cut-outs 14b, 14c, 14d and 14e in certain plates 12b, 12c, 12d and 12e are off-set, clockwise, some 45°, 90°, 135° and 180°, respectively from the central axis of the cut-out 14a and it will be appreciated that when the plates 12 are of equal thickness and the angle by which the central axis of each aperture is off-set from the central axis of the aperture in the preceding plate is constant throughout the length of the device 11 the spacings between the plates 12a and 12b, 12b and 12c, 12c and 12d, and 12d and 12e, will be equal and the cut-outs 14 will define a continuous passage through the stack of plates 12.

When a succession of bottles, in contacting relationship, enter the device 11 through cut-out 14a each bottle in traversing through the device is progressively turned through 180° and released through the cut-out 14e in plate 12 in inverted condition.

Conversely, of course, if the plate 12e defines the lead-in to the device 11 bottles delivered to the cut-out 14e with their neck lowermost and bodies uppermost will be turned clockwise, as viewed from the left in FIG. 1, and will be released from the plate 12a in their normal free-standing positions with their base lowermost and the neck uppermost.

It must be observed that as the device defines a bottle-shaped passageway the device can only process bottles having the general shape and configuration of the cut-outs 14 but of smaller dimensions than the cut-outs 14 so as to be capable of traversing along the passageway with the axis of rotation of each bottle parallel to the planes of the plates 12a. It will also be observed that when the surfaces defining the cut-outs 14 are at right angles to the planes of the plates 12 bottles traversing through the device are not guided by continuous surfaces by are rather indexed by each plate in the desired direction of turning.

It will also be apparent that when the plates 12 are of equal thickness and the degree of turning imparted by each plate in the stack is the same as for all the other plates in the stack the degree of off-set of the cut-outs 14 to afford a desired curve can be readily calculated and thus, if the stack comprises thirty six plates and the device is to turn an article through 180°, each plate must impart a 5° turn to each bottle passing therethrough. When the device 11 is to have the box-like configuration illustrated in FIG. 1 and the cut-outs 14 are to be stamped out of the plates 12, the plates 12 may be formed to the desired external dimensions and the bores 13 formed therein. The base for the press can then include an indexing head presenting four pins for engagement into the bore 13, and thus by indexing the head by the desired small angle between each successive stamping of plates 12, and then threading the plates 12 onto four tie-bars in the order in which they are taken from the press, the cut-outs 14 in all the plates will be automatically located in their respective desired orientations.

Figure 2:
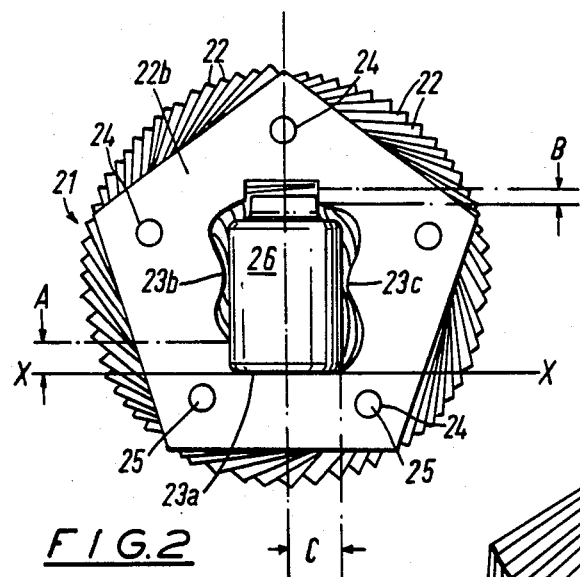
FIG. 2 shows an end view through an alternative arrangement for an article turning device and, FIG. 3 shows, in perspective view, one end of an article turning device showing the mode of mounting.

In the embodiment illustrated in FIG. 2 the turning device, generally indicated by reference numeral 21, comprises a plurality of pentagonal plates 22 in stacked relationship with the central axis of each plate 22 lying on a common axis passing through the device 21. Each plate 22 has a cut-out 23 in the form of an aperture passsing through the plate, the cut-outs 23 in all the plates 22 are identical in shape and configuration, and the orientation of each cut-out 23 in its plate 22 is the same as that for all the other plates. Thus, the cut-out 23a in the first plate 22a has a configuration to receive a jar with a short neck and, as viewed in FIG. 2, the central axis of the cut-out 23a passes through the top corner of the plate 22a and through the mid-point of the bottom side of the plate 22a opposite to said top corner and all the other plates 22 have their cut-outs 23 orientated in identical matter to plate 23a.

Each plate 22 also has five holes 24 therethrough, the said holes 24 are equally spaced apart around a pitched circle, and the pitched circle for the holes 24 is identical for each plate 22.

The plates 22 differ from one another in the circumferential relationship of the holes 24 to the central axis of the cut-out 23, the circumferential locations of the holes 24 in the second and each subsequent plate 22 are off-set by a small amount from the circumferential locations of the holes 24 in the preceding plate 22 and thus when the holes in all the plates 22 in the stack are aligned to form five continuous bores through the stack, to allow tie bars 25 to be inserted into the continuous bores to maintain the plates 22 in contacting relationship, each plate 22 is off-set through a small angle from the preceding plate 22 and the cut-outs 23 define a jar-shaped passage which turns anti-clockwise (as viewed in FIG. 2) in the length direction of the device about the central axis of the device.

The degree of turning imparted to a jar 26 forced along the passageway defined by the cut-outs 23 will be determined by the degree of turning imparted by each plate 22 and the number of plates 22 in the stack and thus, by increasing or reducing the number of plates 22 in the stack, a jar 26 forced along the passageway defined by the cut-outs 23 may have the desired degree of turning imparted thereto. The construction of the device 21 illustrated in FIG. 2 is a relatively simple matter in that the plates 22 with their respective cut-outs 23 but without the holes 24 are identical in shape and configuration and can be made by moulding, stamping, or any other method of producing a plurality of identical plates. The identical plates 22 are then fed successively to a press which has a punch with five hole-forming tools for forming the holes 24 in each plate 22. The plates 22, being five sided, can each be easily and readily located on the base or "pad" for the press and either the plate supporting means or the hole-forming punch arrangement is rotatable about an axis of a plate 22 located in the press and the rotatable part is indexed between successive plate pressing operations so that, when the plates 22 are assembled in the order in which they have been pressed and the tie bars 25 are passed through the aligned bore 24 the cut-outs 23 in the successive plates 22 are off-set by the required degree and form the evenly turning passage through the length direction of the device 21.

Although the cut-outs 14 with respect to FIG. 1 have been described as "bottle-shaped" and the cut-outs 23 with respect to FIG. 2 as "jar-shaped" it will be appreciated that the actual shapes of the cut-outs will be such as to form a passage with adequate clearance to allow the articles passage through the device without damage.

Further, as each cut-out in a plate is off-set from the preceding cut-out, each plate will present parts protruding into a projection of the cut-out in the preceding plate, these protruding parts will generally define the parts of the passage enforcing rotation of the article, but other parts of the cut-outs will simply serve to support the articles. Thus, and with reference to FIG. 2, it wll be obvious that a jar 26 entering the aperture 23a will be engaged by parts of the second plate equivalent to the parts A, B, and C shown in FIG. 2 and which parts protrude into the projection of the cut-out 23a, these said parts "A", "B", and "C" will initiate the anti-clockwise turning of the jar 26 but as each jar 26 progresses along the passage and passes through that point at which the vertical plane passing through its centre of gravity is no longer passing through its base, the weight of the jar 26 will be assisting the anti-clockwise rotation, the force exerted by the weight of the jar urging further anti-clockwise rotation will increase towards the end of the device and, therefore, whilst the part "B" is still required to ensure that the jar 26 meets a minimal degree of rotation the force between the parts "B" and the jar 26 may reduce as the jar 26 progresses through the passage and, in many examples, the jar 26 may loose contact with the parts "B" over certain lengths of the passage. It is primarily for this purpose, to ensure a support for the jar 26 as it progresses through the channel, that the "body" part of each cut-out is waisted, as at 23b and 23c, to provide a support available for the jar 26 when the rotational axis of the jar 26 lies horizontal or towards the horizontal.

The jars 26 to be processed by the devices 21 in FIG. 2 may pass over a dead plate, such as the dead plate 15, shown in FIG. 1, and in such a case bottles to be provided for processing by the device 11 in FIG. 1 and jars 26 to be processed by the device 21 in FIG. 2 will be supplied to the dead plate by a conveyor (not shown), the articles will be allowed to accumulate, in succession, on the conveyor and the dead plate and the driving force for driving articles through the device 11, or the device 21, can thereby be established in identical way to the prior art devices.

However, for some applications, it is desired that a conveyor for the articles should pass directly beneath the turning device so that, in effect, the turning device is mounted over part of a length of a conveyor. When such a facility is necessary and the central axis of each cut-out has a greater length than the maximum width of the cut-out at right angles to said central axis, as is the case in both the FIG. 1 and FIG. 2 embodiments, the stack of plates can be severed along the line "X" not shown in FIG. 2 and the upper part of the severed stack of plates, that is to say the part containing the jar-shaped passageway, can be mounted over the conveyor.

Figure 3:
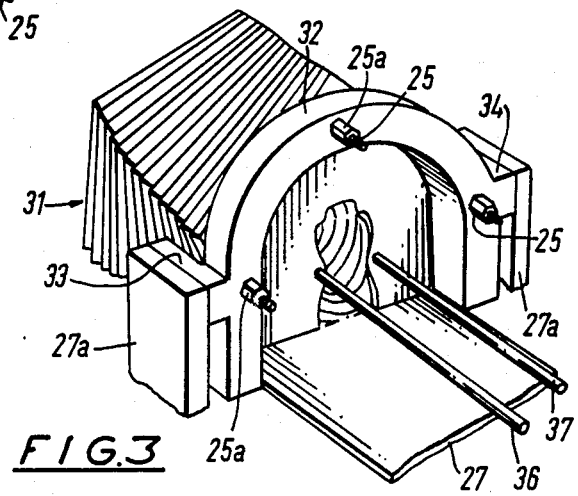

FIG. 3 shows one method for mounting such a severed device relative to a conveyor 27, in this example the device 31 is identical in construction to the device 21 with the exception that the plates are off-set to provide a clockwise turning passageway, and the tie bars 25 extend outwardly from the stack of plates and pass through the arcuate shoes 32, (only one of which is shown) one to each end of the stack of plates. Thus, when the nuts 25a of the tie bars 25 are applied and the tie bars 25 are tensioned the stack of plates is held in compression between the shoes 32.

Each shoe 32 presents two lugs 32 and 34 secured to frame members 27a forming part of the frame support for the conveyor 27 whereupon the device 31 is supported above conveyor 27 and the conveyor 27 can convey articles between guide rails 36, 37 into the passageway through the device 31.

The plates 12 or 22 may be made of any rigid or substantially rigid material but are conveniently formed in a low friction plastics material.

Whilst the present invention has been described by way of example with reference to specific embodiments the invention is not restricted thereto and many modifications and variations of the basic invention will be apparent to persons skilled in the art.

I claim:

1. A static article turning device comprising:
   (A) a succession of plates each bearing an aperture generally of the outline shape of the article to be turned; the apertures collectively defining a path of traverse of the article through the device; and
   (B) obstructions, formed in each plate subsequent to the first one along said path of traverse, by parts thereof delineating the aperture and angularly displaced in relation to the like parts of the last preceding plate, so that, as the article passes along the path of traverse the obstructions incrementally deflect the article about an axis passing therethrough and parallel with the path of traverse, thereby to change the orientation of the article; said plates being spaced so as to prevent movement of the article following any incremental deflection thereof.

2. A device as set forth in claim 1, wherein said path of traverse is rectilinear and said plates are of planar form.

3. A device as set forth in claim 1, wherein at least some of said plates are spaced apart.

4. A device as set forth in claim 1, wherein at least some of said plates are contiguous.

5. A device as set forth in claim 1, wherein each plate is formed by forming the aperture in each plate in the same orientation and providing holes in said plates by which they can be assembled on tie rods to form said succession with the apertures requisitely angularly offset.

6. A device as set forth in claim 5, wherein the holes are formed in the plates by indexing each succeeding plate to the requisite angularly off-set orientation in relation to the last preceding plate and then making the holes therein.

7. A device as set forth in claim 1, wherein each plate is formed by forming the apertures in each succeeding plate with the plate requisitely angularly off-set in relation to the last preceding plate so that, when the plates per se are mounted in the same orientation, they form said succession; and providing holes in said plates for so mounting them in the same orientation by means of tie rods.

8. A device as set forth in claim 1, wherein said apertures are waisted.

9. A device as claimed in claim 1, wherein the plates are clamped between end shoes and the shoes are held in place by tie rods passing therebetween.

10. A device as claimed in claim 9, wherein said tie rods pass through holes in the plates to ensure that the plates are maintained in position.

11. A device as claimed in claim 9, wherein the tie rods pass between the end shoes to abut externally of the plates to ensure that the plates are maintained in position.

12. In combination, a device as set forth in claim 1, and a conveyor providing a moving conveying surface; said plates being formed to permit a lateral aspect of the succession thereof to lie adjacent said conveying surface whereby the conveyor surface can be used to transport articles into the device and to impose a force on the articles entered onto the device, by contact with articles on the conveyor surface yet to be entered, sufficient to force the articles through the device.

* * * * *